US010554428B2

(12) United States Patent
Dotzler et al.

(10) Patent No.: US 10,554,428 B2
(45) Date of Patent: Feb. 4, 2020

(54) DEVICE AND METHOD FOR DATA TRANSMISSION

(71) Applicant: Technische Universität München, München (DE)

(72) Inventors: Andreas Dotzler, München (DE); Maximilian Riemensberger, Eching (DE); Michael Heindlmaier, Freising (DE)

(73) Assignee: TECHNISCHE UNIVERSITÄT MÜNCHEN, München (DE)

( * ) Notice: Subject to any disclaimer, the term of this patent is extended or adjusted under 35 U.S.C. 154(b) by 398 days.

(21) Appl. No.: 15/123,123

(22) PCT Filed: Feb. 13, 2015

(86) PCT No.: PCT/EP2015/053096
§ 371 (c)(1),
(2) Date: Sep. 1, 2016

(87) PCT Pub. No.: WO2015/132065
PCT Pub. Date: Sep. 11, 2015

(65) Prior Publication Data
US 2017/0078106 A1 Mar. 16, 2017

(30) Foreign Application Priority Data
Mar. 5, 2014 (DE) .......................... 10 2014 102 898

(51) Int. Cl.
*H04L 12/18* (2006.01)
*H04W 76/40* (2018.01)
(Continued)

(52) U.S. Cl.
CPC .......... *H04L 12/185* (2013.01); *H04L 1/0041* (2013.01); *H04L 12/1877* (2013.01);
(Continued)

(58) Field of Classification Search
CPC .......... G06F 12/084; G06F 2212/1016; H04L 67/2842; H04L 67/06; H04L 1/0041; H04L 1/008
See application file for complete search history.

(56) References Cited

U.S. PATENT DOCUMENTS

| 2007/0211720 A1* | 9/2007 | Fuchs ................. H04L 12/1868 370/390 |
| 2010/0023525 A1 | 1/2010 | Westerlund et al. |
| 2011/0099437 A1* | 4/2011 | Ramakrishnan ...... H04L 1/0007 714/704 |

OTHER PUBLICATIONS

Yair Amir, A Cost-Benefit Flow Control for Reliable Multicase and Unicast in OVerlay Netowrks, IEEE/ACM Transactions on Networking, vol. 13, No. 5, Oct. 2005.*
(Continued)

*Primary Examiner* — Chirag R Patel
(74) *Attorney, Agent, or Firm* — Global IP Counselors, LLP

(57) ABSTRACT

A method which is implemented by an access point, and in which requests are received from a number of user devices, in which each of the requests specifies one or multiple requested file blocks of at least one file. A set of multicast groups is determined based on the received requests, and each multicast group contains a set of indices of one or multiple of the user devices and a set of indices of the file blocks which are to be transmitted to the user devices indicated in the multicast group. For each multicast group of the set the file blocks indicated in the multicast group are retrieved and encoded, and a forward error correction process is used. For each of the multicast groups of the set the encoded file blocks indicated in the multicast group are transmitted to the user devices indicated in the multicast group.

4 Claims, 5 Drawing Sheets

(51) Int. Cl.
*H04L 1/00* (2006.01)
*H04L 29/08* (2006.01)

(52) U.S. Cl.
CPC .......... *H04L 12/1886* (2013.01); *H04L 67/06* (2013.01); *H04L 67/1097* (2013.01); *H04L 67/2842* (2013.01); *H04W 76/40* (2018.02)

(56) References Cited

OTHER PUBLICATIONS

Gopalakrishnan V et al.: "CPM: Adaptive Video-on-Demand with Cooperative Peer Assists and Multicast", INFOCOM 2009. The 28th Conference on Piscataway, NJ, USA, Apr. 19, 2009, pp. 91-99, XP031468749, ISBN: 978-1-4244-3512-8, Section I-III.
Zheng Yu Xie et al: "An advanced content delivery scheduling method for block multicast transfer", Local Computer Networks, 2003. LCN '03. Proceedings. 28th Annual IEEE International Conference on Oct. 20-24, 2003, Piscataway, NJ, USA, IEEE, Oct. 20, 2003, pp. 220-228, SP010665968, DOI: 10.1109/LCN.2003.1243131, ISBN: 978-0-7695-2037-7, Sections 1. 2. 3, 1-3.4.
International Search Report for the corresponding international application No. PCT/EP2015/053096 dated Apr. 10, 2015.

\* cited by examiner

DEVICE AND METHOD FOR DATA TRANSMISSION

CROSS-REFERENCE TO RELATED APPLICATIONS

This U.S. National stage application claims priority under 35 U.S.C. § 119(a) to German Patent Application No. 10 2014 102 898.8, filed on Mar. 5, 2014, the entire contents of German Patent Application No. 10 2014 102 898.8 are hereby incorporated herein by reference.

BACKGROUND

Field of the Invention

This application relates to devices and methods for data transmission, in particular to devices and methods, wherein multiple user devices are aggregated in to groups, and the groups are sent the same data packages, respectively.

Description of Related Art

The prior art includes video-on-demand (VoD)-methods, wherein video data is transmitted to user equipment, professionally known as user devices (UD), via a wireless network. The user devices may be mobile devices, televisions or the like, for example. During a VoD-transmission data is usually transmitted to the different user devices via a common wireless transmission medium having a limited bandwidth. Moreover, wireless transmissions are often unreliable due to external interference fields. Thus, methods for forward error correcting, professionally known as FEC, and feedback methods as well as surveillance and correction methods using data other than the useful data have been developed. Furthermore, it is known that both user devices and access points, professionally known as AP, from which user data is transmitted to the user devices, can store user data.

Moreover, the prior art contains methods with which data is sent independently to each recipient (unicast) or with which data is sent independently to each group of recipients (multicast). Single data streams may be independently FEC-coded, so as to ensure a high quality of transmission.

SUMMARY

It is thus an object of the invention to provide multiple user devices with multiple files or portions thereof in an efficient and reliable manner. Here, the invention particularly allows to reduce the number of transmitted data packages.

According to a first aspect thereof, the invention provides a method performed by an access point, the method comprising receiving requests of a number of user devices, each of the requests indicating one or multiple requested data blocks of at least one file. A set of multicast groups is determined based on the received requests, the multicast groups including a set of indices of one or multiple user devices and a set of indices of the data blocks which are indexed to the user devices in the multicast group and are to be transmitted to the user devices. The data blocks indexed in the multicast group are retrieved and encoded for each multicast group of the set of multicast groups, wherein a forward error correction method is used. For each multicast group of the set of multicast groups the encoded data blocks indexed in the multicast group are transmitted to the user devices indexed in the multicast group.

The user device may thus, starting from the locally available data blocks, which are stored in a cache of the user device, for example, and from the FEC encoded data blocks received from the access point, completely recover the requested file and in particular reconstruct the data blocks missing in the cache. By combining the data blocks stored in the cache of the user device and the FEC encoded data blocks the number of transmitted data packages is significantly reduced. The abovementioned object is thus solved whereby multicast transmissions, FEC encoding and caching are used.

The data blocks may be, as an example, blocks of one or multiple audio files, video files or other files.

According to a preferred embodiment, at least some of the data blocks indexed in the multicast groups of the set of multicast groups are retrieved from one or multiple content servers, wherein in particular a reliable backhaul connection is used between the access point and the one or multiple content servers. A reliable connection should be understood as a connection which uses acknowledgement (ACK) and automatic repeat request (ARQ) mechanisms in a connection layer, professionally known as link layer. In some embodiments, data blocks indexed in the multicast groups of the set of multicast groups, and in particular indexed in one of the multicast groups of the set of multicast groups, are retrieved from at least two different content servers.

According to a preferred embodiment, multiple candidate sets are determined and the set of multicast groups is determined based on a comparison of an effective service benefit and effective multicast costs for each of the sets of candidates. Determining of the set of multicast groups may in particular include an iterative method.

According to a preferred embodiment, the effective service benefit is determined based on any of a tolerable delay during transmission of the data blocks, of priorities of the data blocks received by the user devices, of predetermined priorities of the user devices, and of quality of service requirements received by the user devices.

According to a preferred embodiment, the effective multicast costs are determined based on any of a number of expected transmissions, of an expected total duration of transmission to the user devices indexed in the multicast groups of the set of multicast groups, of channel qualities of connections between the access point and the user devices indexed in the multicast groups of the set of multicast groups, and of durations and transmission speeds to the user devices indexed in the multicast groups of the set of multicast groups. The channel quality of a connection between the access point and a user device may in particular be transmitted from the user device to the access point, so that the access point receives information about the channel quality from the user device.

According to a preferred embodiment, at least one of the data blocks indexed in at least one of the multicast groups of the set of multicast groups is an incomplete part of a file. With this embodiment, parts of files may be transmitted instead of complete files. Hence, a repeated transmission of the whole file is avoided, if only one or multiple parts of the file are missing on the user device.

According to a preferred embodiment, at least two of the data blocks indexed in at least one of the multicast groups of the set of multicast groups are parts of different files. With this embodiment, a simultaneous multicast transmission of multiple files, i.e. in the same process sequence, is possible.

According to a preferred embodiment, the encoded data blocks are transmitted to the user devices indexed in the multicast group via an unreliable, in particular a wireless broadcast connection. An unreliable connection, following the above definition, is to be understood as a connection which does not use an acknowledgement (ACK) and automatic repeat request (ARQ) mechanism in a connection layer, professionally known as link layer.

According to a preferred embodiment, information about the multicast group is transmitted to each user device indexed in the multicast group, wherein the information about the multicast group indicates in particular the user devices indexed in the multicast group and/or the data blocks indexed in the multicast group.

According to a preferred embodiment, information about a forward correcting code used with the forward correcting method is transmitted to each user device indexed in the multicast group.

According to a preferred embodiment, during determining the set of multicast groups starting from an initial set $C_0=C^{start}$ using an iterative procedure in each iteration step a first candidate set $C^{new}$ and a second candidate set $C^{add}$ are determined, and wherein that of the first and second candidate sets is determined as a result set $C_p$ for an iteration step that has a higher assessment value P, wherein the assessment value P takes into account an effective service benefit and effective multicast costs of the set, wherein the iterative procedure is terminated, if neither the first candidate set nor the second candidate set has a higher assessment value than the result set of the previous iteration step.

It is particularly preferred that determining the first candidate set comprises $C^{new}$ comprises:
(I.) for each user device ($m \in U$), from which a request was received, and for each requested data block ($ij \in D_m$):
  (a) Forming a multicast group $G'=(\{m\}, \{ij\})$,
  (b) Forming a set $C'=C \cup \{G'\}$,
  (c) Determining an assessment value $P(C')$ for $C'$ and
(II.) Determining as a first candidate set that set of the sets calculated in step which have the highest assessment value.

Here, U designates the set of user devices from which a request was received, and $D_m$ designates the index set of the data blocks which have been requested by a user device $m \in U$. It is particularly preferred that determining the second candidate set $C^{add}$ comprises:
(I.) for each group $G_k=(U_k, B_k) \in C_p$ of the result set of the previous iteration step and for each requested data block $ij \in U_{m \in U} D_m$:
(a) Forming a multicast group $G'=(U', B')$, wherein $U'=U_k$ and $B'=B_k \cup \{ij\}$,
(b) for as long as the assessment value $P(C')$ increases:
  (i) for each user device $m \in U \setminus U'$:
    (A) forming a set $C'=(C \setminus \{G_k\}) \cup \{U' \cup \{m\}, B'\})$,
    (B) determining the assessment value $P(C')$ for $C'$ and
  (ii) determining as a new $G':G'=(U' \cup \{m\}, B')$ for the user device m, for which the highest assessment value was determined in step (i),
(c) forming the set $C'=(C \setminus \{G_k\}) \cup \{(U', B')\}$,
(d) calculating the assessment value $P(C')$ for $C'$,
(II.) determining as a second candidate set that set of the sets $C'$ that was formed in step I. having the highest assessment value.

In some embodiments, the assessment value (P) for a set (C) of multicast groups is determined as a monotone increasing function of the effective service benefit ESB with constant effective multicast costs EMC and as a monotone decreasing function of the effective multicast costs EMC with constant effective service benefit ESB. The skilled person will certainly understand that in other embodiments the assessment value (P) for a set (C) of multicast groups may be determined as a monotone decreasing function of the effective service benefit ESB with constant effective multicast costs EMC and as a monotone increasing function of the effective multicast costs EMC with constant effective service benefit ESB. In the first case a high value of P is advantageous, whereas in the second case a low value of P is advantageous. Since, according to the invention both approaches may be implemented, only the first case is illustrated in more detail for the sake of a simpler description.

It is particularly preferred that the assessment value P for a set C of multicast groups is determined as $$P(C)=\alpha ESB(C)-\beta EMC(C), \quad (1)$$

wherein ESB designates the effective service benefit for group C, EMC designates the effective multicast costs for group C, and $\alpha$ and $\beta$ are, preferably non-negative, constants, non-negative real numbers, for example.

Alternatively, the assessment value P for a set C of multicast groups may be determined as $$P(C)=\alpha ESB(C)/EMC(C), \quad (2)$$

wherein ESB designates the effective service benefit for group C, EMC designates the effective multicast costs for group C, and $\alpha$ and $\beta$ are, preferably non-negative, constants, non-negative real numbers, for example.

According to a further aspect of the invention, an access point configured for performing the abovementioned method is provided. The access point may in particular be a wireless access point, which is configured for wireless transmission of data to user devices. The access point may be a Wi-Fi access point or an LTE base station, for example According to a further aspect of the invention, a method is provided, wherein a user device receives an input of a user, the input referring to a requested file. The user device transmits, as a reaction to receiving the input, a request to an access point, the request including information about the requested file and information about data blocks of the requested file, the data blocks not being stored in a cache of the user device, wherein the user device transmits information about data blocks stored in the cache to the access point.

The method may further comprise, before the abovementioned method steps, receiving a content list with information about available files from the access point, displaying the information about the available files, and receiving a selection of one of the available files from the user as a requested file.

According to a preferred embodiment, the user device receives from the access point one or multiple encoded data blocks of the requested file and decodes the data blocks, wherein a forward correcting method is used.

According to a preferred embodiment, the user device receives information about a forward correcting code from the access point and uses the forward correcting code during decoding the received encoded data blocks.

According to a further aspect of the invention, a user device is provided, which is configured for performing the abovementioned method. The user device may be, for example, a mobile device, such as a smartphone or tablet PC, although the invention is not limited in this regard.

According to a further aspect of the invention, a machine readable media is provided, comprising stored instructions that, when executed in a device cause the device to perform a method of the kind described above.

BRIEF DESCRIPTION OF THE DRAWINGS

The skilled person will recognize further features and advantages of the present invention by means of the subsequent detailed description and the enclosed drawings. Herein.

DETAILED DESCRIPTION OF EMBODIMENTS

Figure 1:
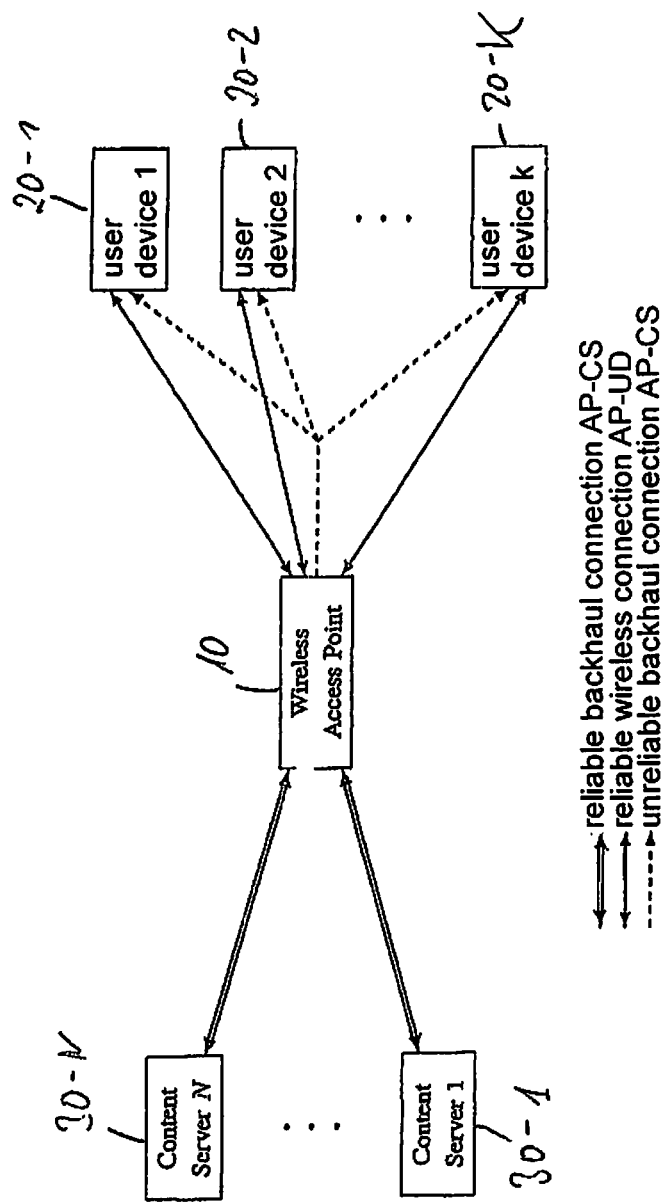
FIG. 1 depicts a schematic block diagram of a multicast system including a wireless access point according to an embodiment and multiple user devices according to an embodiment.

FIG. 1 depicts a schematic block diagram of a multicast system having a wireless access point (AP) 10 and multiple user devices (UD) 20-1, 20-2, . . . , 20K according to embodiments of the invention. The system may, for example, be able to deliver any of video data, of audio data, and of data of another data type to one or multiple of the user devices 20-1, 20-2, . . . , 20-K.

With the system illustrated in FIG. 1, N≥1 content servers (CS) 30-1, . . . , 30N (herein collectively referred to with reference numeral 30) are provided. The CS 30 respectively include a physical storage medium on which user data is stored. As mentioned at the beginning the user data may be video data and/or audio data, for example. It may be provided that each CS 30 stores one or multiple complete files, for example, such as complete audio files, or video files, or one or multiple parts of multiple parts of files, particularly data blocks.

The various CS 30 are connected to the AP 10 via a reliable backhaul connection. The backhaul connection between the AP 10 and the CS 30 may be wired or wireless. Furthermore, the AP 10 is connected to multiple user devices 20-1, 20-2, . . . , 20-K (herein collectively referred to with reference numeral 20) via a reliable wireless connection. Each user device 20 is connected to the AP 10 via a reliable wireless connection. A reliable connection, as used herein, is to be understood as a connection, professionally also known as a link, which uses acknowledgement (ACK) and automatic repeat request (ARQ) mechanisms in a connection layer, professionally known as link layer. The use of ACK and ARQ mechanisms ensures a reliability of the wireless communication, if certain minimal conditions referring to the channel between the AP 10 and the user devices 20 are met. Additionally, the AP 10 may send packages via an unreliable broadcast channel to one, some, or all user devices 20, wherein the packages are lost probabilistically and no ACK and ARQ mechanisms are applied in the link layer.

During operation one, some, ore all user devices 20 request certain parts, particularly data blocks, of certain files, such as certain video or audio files, which are supplied by one or multiple of the CP 30 via the AP 10. On the other hand, each user device 20 probably already has some or all data blocks of some files stored in a local cache of the user device 20. According to an embodiment of the invention the system manages the requests of the user devices 20 and serves the requests, wherein the local caches in the user devices 20 and in the AP 10 are used to reduce the traffic on the backhaul connection and on the wireless connection. To achieve this, the AP 10 groups the user devices 20 with their requests and cache contents, wherein the requests are compared to the cache contents and an FEC code is used with the unreliable broadcast connection to the user devices 20.

Figure 2:
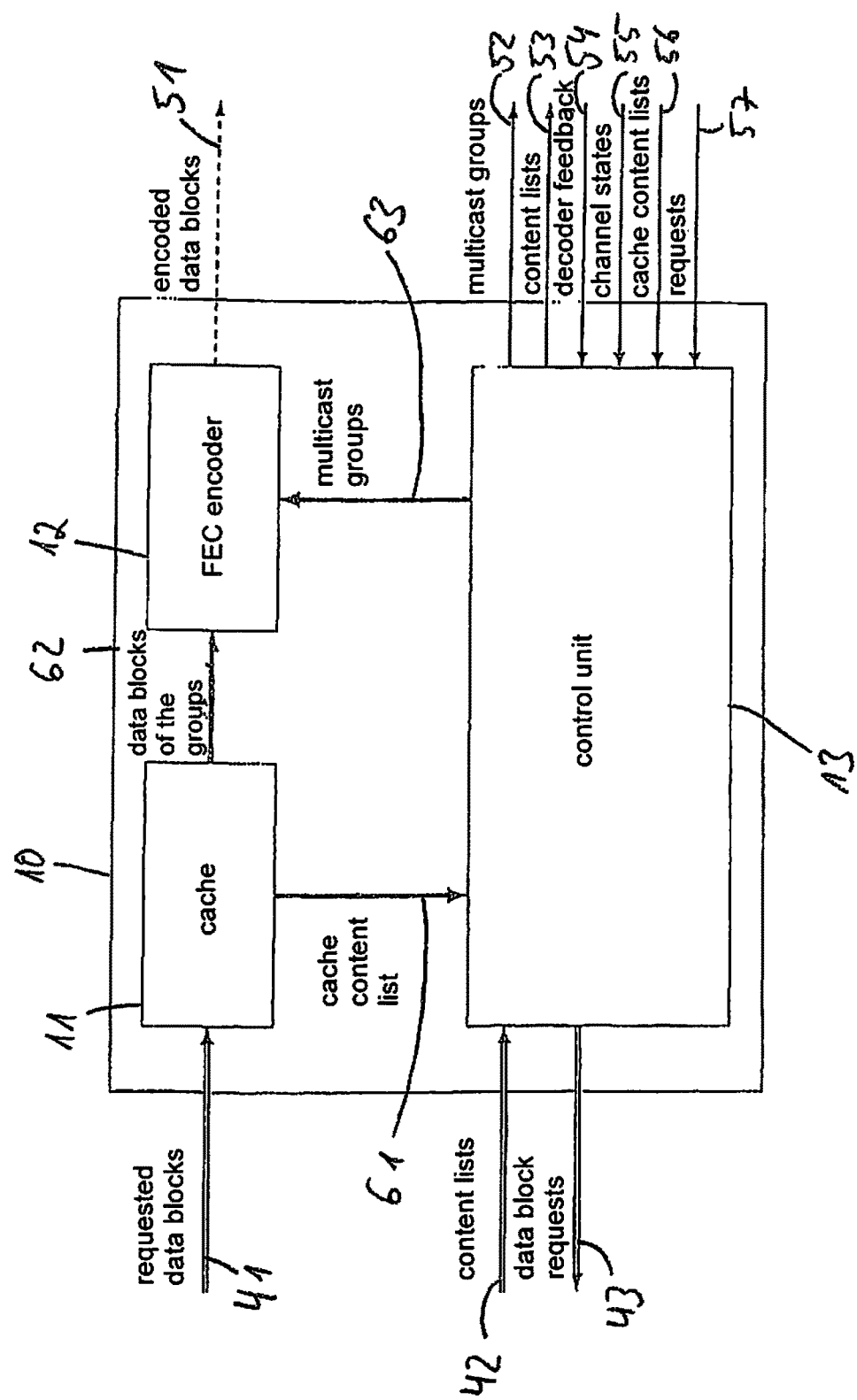
FIG. 2 depicts a schematic block diagram of an access point according to an embodiment.

FIG. 2 depicts a schematic block diagram of an access point 10 according to an embodiment of the invention. The access point 10 may be, for example, a Wi-Fi access point, an LTE femto cell device, an LTE base station, or the like. The AP 10 includes a content cache 11, an FEC encoder 12, and a multicast control unit 13, professionally also known as multicast-control-unit (MCU). The AP 10 includes content lists 42 of the CS 30. The content lists 42 include information about content, professionally known as content, which is supplied by the content servers 30 and stored therein, for example. In more detail, the control unit 13 of the AP 10 receives the content lists 42 and manages data encoding and supply to the user devices 20. The control unit 13 forwards the content lists 42 to the user devices 20 (see reference numeral 53 in FIG. 2), so that the user learn which content is available and may choose one or multiple contents from the list. The user devices 20 output requests 57 thereupon, which are received by the control unit 13 of the AP 10. The requests 57 of the user devices respectively include a list of data blocks which are demanded by the user device. In some embodiments, the requests 57 additionally include priority information for one or multiple of the data blocks included in the requests 57. Furthermore, the user devices 20 transmit cache content lists 56 to the AP 10 and in greater detail to the control unit 13 of the AP 10. The cache content lists 56 include information about which parts of the files are stored in the cache of the user device 20. Moreover, the user devices 20 send channel state information 55, professionally known as channel state information (CSI), referring to the unreliable broadcast connection, to the AP 10. The channel state information 55 may include package loss rates, for example.

Furthermore, the control unit 13 of the AP 10 receives from the local cache 11 of the AP a list 61 of content available in the cache 11. Subsequently, the AP 10 requests from the CS 30 those parts of the files (data blocks 42) that are non-locally stored in the cache 11 of the AP 10, but are requested from the AP 10 by at least one user device 20, and stores the received data blocks (reference numeral 41) in the cache 11 in response to that.

Based on the requests 57 of the user devices 20, the cache content lists 56 of the user devices 20 and the channel state information 55, the control unit 13 of the AP 10 determines multicast groups, i.e. pairs of sets of user devices 20 and sets of data blocks, so that the data blocks of the group are transmitted to all user devices 20 of the group in a multicast transmission. The determination of these groups, referring to the control unit 13, is explained in more detail below.

The control unit 13 of the AP 10 sends a multicast group message 52 to the user devices 20 of the corresponding multicast group. The multicast group message 52 includes information about the multicast groups determined by the control unit 13, such as about the data blocks and/or the user devices in the group. In this manner, the user devices 20 are informed about which data blocks they have to receive and decode. Moreover, the control unit 13 of the AP 10 sends a multicast group message 63 to the FEC encoder 12 of the AP 10, so that the FEC encoder 12 may separately combine and encode the file parts for each of the multicast groups. The FEC encoder 12 loads the file parts needed from the cache 11 (data blocks 62) and generates encoded data packages 51 for each group, the data packages 51 subsequently being transmitted from the FEC encoder 12 to the user devices 20, wherein the unreliable broadcast connection is used. It may be provided that each user device 20 receives and decodes only those data packages 51 which belong to a multicast group, which the user device 20 itself belongs to. In the alternative, at least one of the user devices 20 may also receive, store in the cache of the user device 20, and optionally decode before storing data packages 51 which belong to a multicast group that the user device 20 does not belong to. The latter may be useful so as to fill the cache of the user device 20 with file parts which potentially could be used in the user device 20 in the future. Thus the number of necessary transmissions in the future may be reduced. The FEC encoder 12 terminates the generating of packages for a multicast group, if a termination condition is met. The termination condition may provide, for example, that the control unit 13 received a decoder feedback 54 from all the user devices 20 of the multicast group, whereby the user devices 20 report to the AP 10 that they successfully decoded all file parts of the multicast group. Alternatively or additionally, the termination condition may include an expiration of a prescribed time period, professionally known as timeout, or an achievement of a prescribed maximum number of generated packages.

Figure 3:
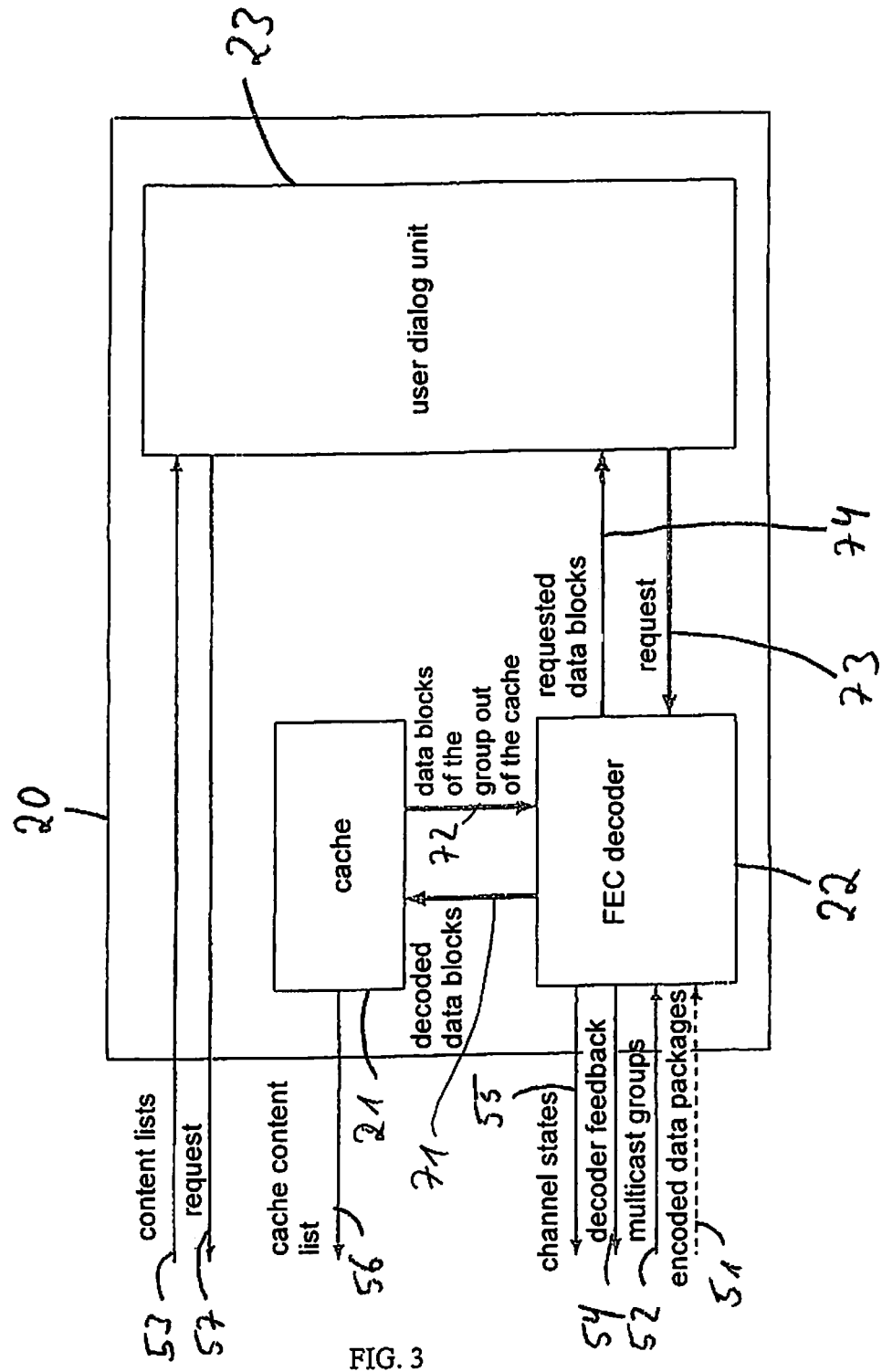
FIG. 3 depicts a schematic block diagram of a user device according to an embodiment.

FIG. 3 depicts a schematic block diagram of a user device 20 according to an embodiment. The user device 20 includes a content cache 21, an FEC decoder 22, and a user dialog unit 23, professionally also known as user interaction unit. The FEC decoder 22 corresponds to the FEC encoder 12 of the AP 10, as for example depicted in FIG. 2, that is it is configured for decoding data blocks which were encoded by the FEC encoder 12. The user dialog unit 23 receives the content list 53 from the AP 10. The user dialog unit 23 displays the received content lists 53 for the user. To this end the user dialog unit 23 may be connected with a display, such as a screen, or may include such display. Furthermore, the user dialog unit 23 is configured to receive a content choice of the user and translate it to a request 57 for files or data blocks. The user dialog unit 23 of the user device 20 sends the request 57 to the AP 10, as well as a copy of the request 73 to the FEC decoder 22. The FEC decoder 22 is hence informed about which decoded data blocks are to be returned to the user dialog unit 23 and which ones are not. Additionally, the user device 20 communicates to the AP 10 the content of its cache 21 on the basis of the transmission of a cache content list 56. Furthermore, the FEC decoder 22 of the user device 20 transmits the channel states by means of a channel state message 55 to the AP 10.

Furthermore, in the illustrated embodiment the FEC decoder 22 sends a decoder feedback 54 to the AP 10, when the FEC decoder 22 has successfully decoded all file parts of the multicast group. As described above referring to FIG. 2, the decoder feedback 54 may be used by the AP 10, so as to find whether the termination condition is met. In embodiments in which another termination condition than receiving the decoder feedback 54 is implemented with the AP 10, it may be provided that the FEC decoder 22 does not send a decoder feedback 54 to the AP 10.

In the reverse direction, the user device 20 is informed by the AP 10 about the structure of the certain multicast groups based on a multicast group message 52. The multicast group message 52 particularly includes information about the data blocks included in the multicast group and the chosen FEC code. Furthermore, the user device 20 is informed by the AP 10 that it belongs to the multicast group. This may comprise, for example, that the multicast group message 52 includes information about the user devices 20 belonging to the multicast group. Alternatively or additionally, the multicast group message 52 may selectively be sent to those user devices 20 that belong to the multicast group, for example. Also, the user device 20 receives from the AP 10 encoded data packages 51 which belong to the multicast group in which the user device 20 participates in. The encoded data packages 51 are fed to the FEC decoder 22 of the user device 20 in addition to the data blocks 72, which belong to the multicast group and are stored in the cache 21 of the user device 20, so as to recover missing data blocks of the corresponding multicast group, that is those data blocks not stored in the local cache 21 of the user device 20. The decoded data blocks 71 are transmitted from the FEC decoder 22 to the cache 21 of the user device 20, the cache 21 optionally storing the decoded data blocks 71. Those data blocks 74, that were requested with the request 57, are transmitted from the FEC decoder 22 to the user dialog unit 23. The user dialog unit 23 is configured to play back the requested data blocks 74, that is to render requested video files on a display and/or to render a requested audio files via an audio device, for example.

In the illustrated embodiment, the AP 10 is able to determine, based on the request 57 of the user dialog unit 23 and the cash content list 56, which data blocks are needed by the user device 20. In an alternative embodiment, the cache 21 is coupled to the user device 20, so that the user dialog unit receives the cache content list 56 from the cache 21. In this case, it may be provided that the request 57 of the user dialog unit 23 only includes the data blocks missing in the cache 21. In any case it is advantageous, however, when the complete cache content list of the user devices 20 is communicated to the AP 10, so that the grouping yields optimal results. In alternative embodiments, in which the user devices 20 report only parts of their cache content to the AP 10, it is to the algorithm like only these reported parts were stored in the cache 21 of the user device 20.

In the following the operation of the control unit 13 of the AP 10 is explained more closely by means of a method according to an embodiment of the invention.

The control unit 13 receives files, which are subdivided into blocks. The size of a block is F for each block j of file i. The control unit 13 receives blocks from a content provider, such as a content server 30, as illustrated in FIG. 1. The control unit 13 may locally store some or all of the received blocks of some or all files, for example, in cache 11 of the AP 10. The files may be about audio or video files requested by a user, for example.

The set of all data blocks U is designated B. $I_0 \subset B$ is the set of index pairs of those data blocks $ij \in B$, which are locally stored with the control unit 13. A set U of user devices requests some of the data blocks from B, but also has some blocks stored locally. In order to inform the control unit 13 about the request and the cache content, the user device $m \in U$ transmits the cache content $I_m \subset B$ stored in the local cache 21, as illustrated by reference numeral 56 in FIGS. 2 and 3, that is the set of index pairs ij of the data blocks which are stored in the cache 21 of user device m. Furthermore, the user device 20 transmits its request 57 for data blocks to the control unit 13 of the AP 10, wherein the request 57 includes a demand $D_m \subset B$, that is the set of index pairs ij of the data blocks, which the user device m∈U requests from the control unit 13. Optionally, the user device 20 may transmit to the control unit 13 the priorities $W_{m,ij}$ referring to the requested data blocks. Moreover, each user device transmits for some or all modulation or coding scheme indices k, professionally known as modulation and coding scheme (MCS) indices, a channel quality indicator $Q_{m,k}$, such as the signal-to-noise ratio (SNR), the received power, the probability for successful receipt $P_{m,k}$ of data blocks, etc.

From this set of information, the control unit 13 forms multicast groups of user devices and data blocks, which are respectively designated by a pair $G=(U_G, B_B)$, $U_G \subset U$ is the set of user devices and $B_G \subset B$ is a set of data blocks. For each multicast group, the control unit 13 generates and transmits packages of coded information, which is generated from the data blocks having indices in $B_G$, until a termination condition for this group is met, as explained above, for example. The termination condition may include, for example, that a decoder feedback 54, in which the user devices of the group communicate to the control unit 13 that the data blocks were successfully decoded, a prescribed time period is exceeded, or a prescribed maximum number of packages was generated and transmitted, is received. A user device 20 has successfully decoded the data blocks of a multicast group G, when the FEC decoder 22 of the user device 20 is able to determine all data blocks in $B_G$ from the data blocks of group G, which are included in the cache, and from the received data packages belonging to group G. The encoded data packages 51 are generated by using a rateless forward error correcting (FEC) code, for example, such as a raptor code.

As explained above, a multicast group G is a pair $G=(U_G, B_G)$ consisting of a set of user devices $U_G \subset U$ and of a set of data blocks $B_G \subset B$ for each of the user devices, so that each user device $m \in U_G$ is able to recover all data blocks $ij \in B_G$ from the encoded data packages 51 transmitted by the AP 10 and the content of its local cache 21. Functions ESB and EMC assign to each set of groups $C = G_1, \ldots, G_k$ an effective service benefit (ESB) and effective multicast costs (EMC), respectively.

Figure 4:
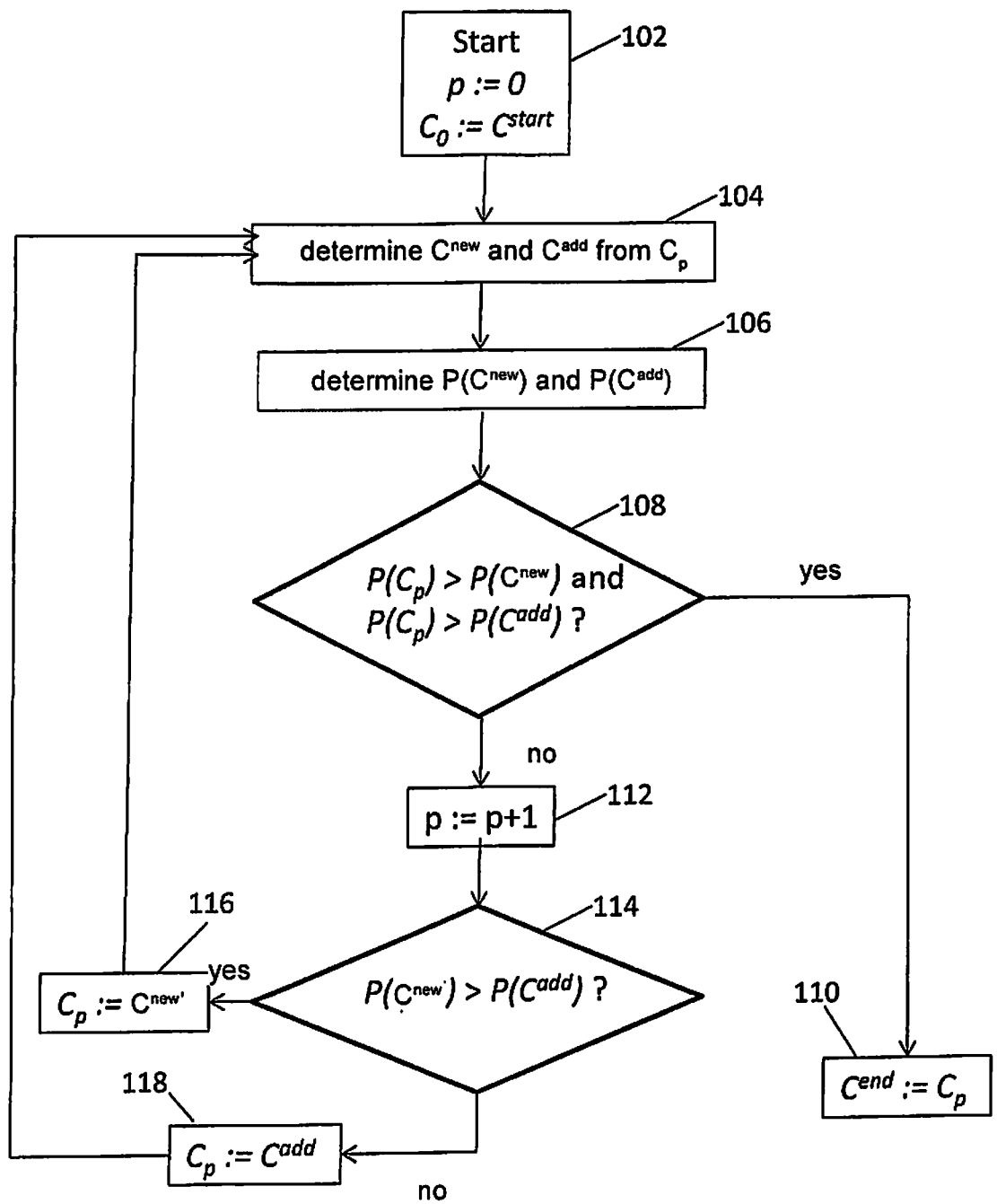
FIG. 4 depicts a flow chart of a section of a method according to an embodiment for determining a set of multicast groups.

In order to determine a set C of multicast groups having high ESB and low EMC, according to some embodiments of the invention a section of a method is performed that is described in the following. Parallel, FIG. 4 illustrates the section of the method as a flow chart.

The method starts in step 102 with a starting set $C_0 = C^{start}$ of multicast groups. In some embodiments $C_0$ is empty. Starting with a counter value p=0 the following iterative method is performed In step 104 new candidate sets $C^{new}$ and $C^{add}$ are determined from the result set $C_p$ of the previous iteration step p, wherein the operations "new" and "add", as explained in the following, are used.

For each candidate set $C^{new}$ and $C^{add}$ an assessment value based on a function P, which is explained in more detail below, is determined in a step 106.

In a subsequent step 108 it is determined, whether the assessment value $P(C_p)$ for the result set $C_p$ of the previous iteration step is larger than the assessment values for both candidate sets $C^{new}$ and $C^{add}$. If this is the case, the method terminates in step 110 and the result set of the previous iteration is used as set of multicast groups for the transmission of the data blocks indexed in the multicast group.

If at least one of the candidate sets $C^{new}$ and $C^{add}$ has a higher assessment value P, the counter value is incremented by one in step 112, and in step 114, it is determined, whether the assessment value of $C^{new}$ is larger than that of $C^{add}$. If yes, $C^{new}$ is used in step 116 as a result set of the current iteration. If no, $C^{add}$ is used in step 118 as a result set of the current iteration. Subsequently, the method proceeds to step 104 and determines new candidate sets for the next iteration step.

The abovementioned operation "new" comprises the following steps:
Step 1: for each user device m∈U and for each demand $ij \in D_m$:
  (a) form $G'=(\{m\}, \{ij\})$.
  (b) form the set $C' = C \cup \{G'\}$.
  (c) calculate the assessment value P of C'.
Step 2: take as $C^{new}$ that set of the sets C' calculated in step 1 which has the highest assessment value P.

The previously mentioned operation "add" comprises the following steps:
Step 1: for each group $G_k = (U_k, B_k) \in C$ and for each requested data block $ij \in U_{m \in U} D_m$:
(a) form $G'=(U', B')$, wherein $U'=U_k$ und $B'=B_k U\{ij\}$.
(b) as long as the assessment value P increases:
  (i.) for each user device m∈U\U':
    A. form the set $C'=(C\backslash\{G_k\})\cup\{(U'\cup\{m\}, B')\}$
    B. calculate the assessment value P of C'.
  (ii.) take as a new $G'=(U'\cup\{m\}, B')$ for the user device m having the highest assessment value.
(c) form the set $C'=(C\backslash\{G_k\})\cup\{(U', B')\}$.
(d) calculate the assessment value P of C'.
Step 2: take as $C^{add}$ that set of the sets C' formed in step 1 which has the highest assessment value.

In the previously described method the assessment value may be determined from the effective service benefit (ESB) and the effective multicast costs (EMC) for the corresponding set of multicast groups, for example.

The effective service benefit (ESB) indicator, also designated service benefit, measures the requirements with regard to priorities, benefit, delay, and quality of service (QoS), related with a set of groups. The ESB may be an arbitrary combination, such as any of a decreasing function of the tolerable delay, until a request must be server, of an increasing function of user and request priorities, and of an increasing function of the user and request QoS requirement (for instance a minimum speed requirement or a minimum quality requirement for video/audio).

The priority is to be understood as the weight or the rank which determines the relative importance of a request of a data block of a user device. A high weight or a low rank of a request leads to a high ESB, if this request of the user device in a multicast group is served. The user device may communicate these priorities to the AP together with the request, in the shape of a sequence of needed data blocks and information about how much delay can be tolerated for each data block. Moreover, the AP may prioritize the requests among the user devices. Quality of service designates the quality in which the demanded content is needed, for instance a resolution and/or a data rate of a video, wherein this content comprises one or multiple data blocks. Should the user devices require a high quality, that is more and/or larger data blocks in a smaller time, then the AP may prioritize them higher. Out of it the priority coefficients $W_{m,ij}$ for each requested data block $ij \in D_m$ of each user device m∈U is determined. The ESB may be calculated out of the priorities and the effective data rates, for instance as the ratio between the sum over all data blocks $$ij \in \bigcup_{G \in C} B_a,$$

included in a multicast group, respectively weighted with the sum of the priorities of all users who request this data block and belong to the corresponding multicast group. In other embodiments however, other definitions of the ESB are possible.

The effective multicast cost (EMC) indicator, also designated effective multicast costs, comprises the expected number of transmission and their respective duration, wherein the cache contents, the content requests, and the channel quality of each member of the group and additionally the length of a transmission and its speed, as it is defined by the modulation and coding scheme (MCS), is taken into account.

Initially the expected number of multicast transmissions $EMTX_k$ for a fixed MCS index k of a group $G=(U_G, B_G)$ is defined as follows:

$$EMTX_k(G) = \max_{m \in U_G} \frac{\sum_{ij \in B_G / l_m} F_{ij}}{P_{m,k}}, \quad (3)$$

wherein $P_{m,k}$ indicates the probability that a package with MCS index k is successfully received by the user device m. The expected multicast transmission time $EMTT_k$ for a fixed MCS index k of a group G is given by $$EMTT_k(G) = \frac{1}{R_k} EMTX_k(G). \quad (4)$$

The expected minimal multicast transmission time due to using the best MCS index out of a set of possible indices is given by $$EMTT(G) = \min_k EMTT_k(G), \quad (5)$$

wherein $R_k$ is the transmission speed for the MCS index k. The EMC indicator of a set C is based on a weighted and possibly transformed combination of the effective multicast transmission times of all groups in the set. The EMC indicator may consider additional grouping conditions, by means of allocating a surcharge to the EMC of a set, which contravenes one or multiple conditions, such as an infinite surcharge.

EMC may for instance be a sum, particularly a weighted sum, of the EMTT(G) over all G out of C. In some embodiments larger values of EMTT(G) are weighted more weakly or more strongly, depending on whether longer multicasts with larger groups are desirable (low costs by more weakly weighting higher EMTTs) or not (higher costs by more strongly weighting higher EMTTs). In another embodiment the effective costs EMC are defined as the multicast time EMTT(G) needed for each group in relation to the needed transmission time, when all user requests, which are served by this group, would be served individually. Here, the difference of EMTT(G) to the total reference transmission time for all individual requests may be taken into account, for example. The value of EMC in this case may be not only as small as possible but also negative, for example, because in this case it reflects the time saved relative to the reference. An alternative definition of the EMC is, for instance, the ratio of the total transmission time, that is the sum of the EMTT(G) over all G in C, to the totally transmitted user data, so the sum of the data block sizes of all data blocks ij which are indexed in at least one multicast group.

The relation between ESB and EMC describes the assessment value, also called performance, so that service performance requirements, measured by ESB, and multicast costs, measured by EMC, are taken into account. The performance of a set of multicast groups C is defined as follows in some embodiments:

$$P(C) = \alpha ESB(C) - \beta EMC(C) \quad (6)$$

with two constants $\alpha$ und $\beta$ which scale and weight the quantities ESB and EMC in a suitable manner. The constants $\alpha$ und $\beta$ may, for example, be non-negative numbers, such as non-negative real numbers. The performance function P is optimized by the above described method.

In an alternative embodiment, the assessment value is, for example, defined as:

$$P(C) = \alpha ESB(C) / EMC(C), \quad (7)$$

wherein $\alpha$ is a constant, particularly a non-negative constant.

Even though the function P is defined in some embodiments explained in detail in such a way that a value of P as high as possible is to be achieved, the skilled person will understand that, in the alternative, in other embodiments a function may be defined for which values as low as possible are desirable.

Grouping constraints may be necessary, so as to ensure that user devices do not have to decode too much undesired data blocks in large groups, whereby an all too high load for the computational resources and for the battery run time of the user device may be caused. Other conditions may be necessary, so as to take in to account the limitations of the FEC code. Possible grouping constraints comprise the maximum number of user devices per group, the maximum number of groups in which a user device may be included, the maximum total size of the data blocks in a group, the maximum number of groups having included a certain data block, etc.

In the abovementioned embodiment, grouping constraints may be incorporated via the EMC. Additionally or alternatively, grouping constraints may be taken into account in another manner.

Variant 1: The grouping constraints are directly incorporated into the algorithm. For example, in step 2 of the above described operation "new" and in steps 1(b) (ii.) and 2 of the operation "add", it may be respectively restricted that that set which has the highest assessment value and at the same time meets the grouping conditions, if applicable, is chosen.

Variant 2: The grouping constraints may explicitly be integrated into the assessment value so that sets C', which do not meet the grouping constraints, receive a very low assessment value, for example negative infinity. The assessment value may be defined as follows:

$$P(C) = \alpha ESB(C) - \beta EMC(C) - \gamma MGC(C),$$

wherein $\gamma$ is, for example, a non-negative constant, such as a non-negative real number, and MGC(C) is an indicator for breaching a grouping constraint (multicast grouping constraints). The MGC indicator would then be 0, for example, if all grouping constraints are met, and be 1 if at least one grouping constraint is not met. If $\gamma$ is chosen to be infinity, one enforces that all grouping constraints must be met. If γ is chosen to be 0 no grouping constraints are considered.

The above described method was investigated using numerical simulation. Therein advantages over the methods for transmitting individual video streams known in the prior art were found, as subsequently described.

Figure 5:
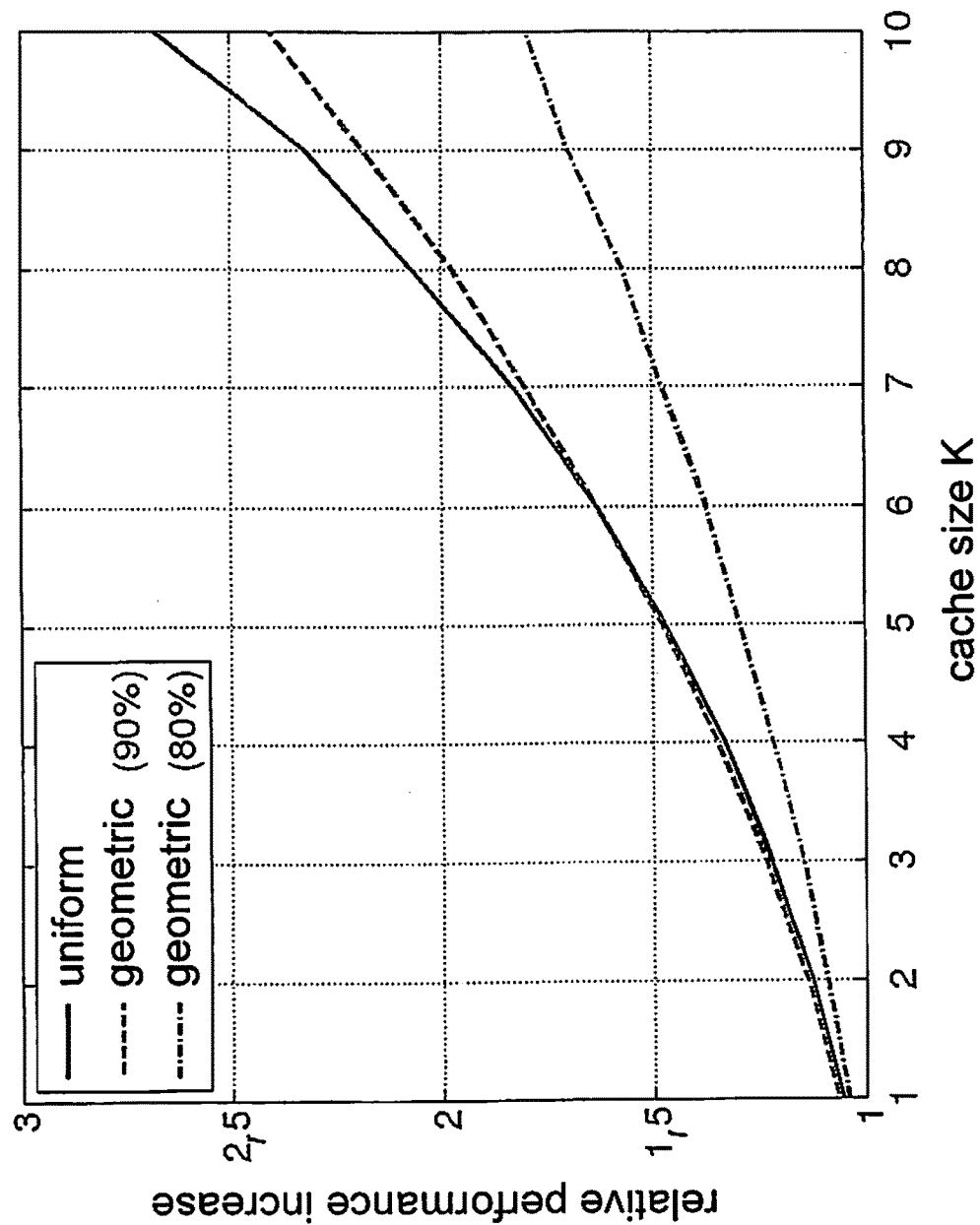
FIG. 5 depicts a graph illustrating the relative performance enhancement when using a method according to an embodiment of the present invention for different popularity distributions of retrieved video content.

FIG. 5 illustrates a graph in which a performance increase is shown over a cache size K for various popularity distributions of requested content. The performance shown in FIG. 5 indicates the reciprocal value of EMC(C), which in turn is defined as the sum of the necessary transmission times EMTT(G) over all C in G, related to the effective transmission costs of a reference method. The reference method is presently defined in a manner that all content is individually supplied to all users, without caching, multicast, etc. The costs of this method are also defined as the sum of all necessary transmission times. In FIG. 5 a system having 50 user devices was investigated and the performance increase for various cache sizes K was considered.

FIG. 5 presently depicts the portion of K=1, in which each user device may store a video, up to K=10. The continuous curve illustrates the increase, if all user devices request a video out of an evenly popular set of 20 videos. The broken curve illustrates the increase, if each user device requests a video out of an arbitrarily sized set of videos, whose popularity is geometrically distributed, so that with a probability of 90% (broken line) and 80% (dash-dotline), respectively, one of the twenty most popular videos is chosen. The caches are presently completely filled according to the corresponding popularity distribution of the requirements. All curves illustrate a moderate up to a large increase already at small to moderate cache sizes.

In the abovementioned detailed description some embodiments of the present invention were described in detail. The skilled person will, however, recognize variations and modifications of the described embodiments. The described method and parts thereof may be implemented with any of an access point, of a user device, and of a machine readable medium.

The invention claimed is:

1. A method performed by an access point, the method comprising:
   receiving requests of a number of user devices, each of the requests indicating one or multiple requested data blocks of at least one file;
   determining a set of multicast groups based on the received requests, the multicast groups including a set of indices of one or multiple user devices and a set of indices of the data blocks which are indexed to the user devices in the multicast group and which are to be transmitted to the user devices;
   retrieving and encoding, for each multicast group of the set of multicast groups, the data blocks indexed in the multicast group, wherein a forward error correction method is used; and
   transmitting to the user devices indexed in the multicast group, for each multicast group of the set of multicast groups, the encoded data blocks indexed in the multicast group,
   wherein during determining the set of multicast groups starting from an initial set using an iterative procedure in each iteration step a first candidate set and a second candidate set are determined, and wherein that of the first and second candidate sets is determined as a result set for an iteration step that has a higher assessment value, wherein the assessment value takes into account an effective service benefit and effective multicast costs for the set, wherein the iterative procedure is terminated if neither the first candidate set nor the second candidate set has a higher assessment value than the result set of the previous iteration step.

2. The method according to claim 1, wherein the assessment value for a set of multicast groups is determined as monotone increasing function of the effective service benefit with constant effective multicast costs and as a monotone decreasing function of the effective multicast costs with constant effective service advantage.

3. The method according to claim 1, wherein the assessment value for a set of multicast groups is determined as a monotone decreasing function of the effective service benefit with constant effective multicast costs and as a monotone increasing function of the effective multicast costs with constant effective service benefit.

4. The method according to claim 1, wherein the assessment value for a set of multicast groups is determined as $$P(C)=\alpha \text{ESB}(C)-\beta \text{EMC}(C)$$

or as $$P(C)=\alpha \text{ESB}(C)/\text{EMC}(C),$$

wherein ESB designates the effective service benefit for group C, EMC designates the effective multicast costs for group C, and α and β are, preferably non-negative, constants.

* * * * *